United States Patent
Kato

(10) Patent No.: US 10,862,342 B2
(45) Date of Patent: Dec. 8, 2020

(54) POWER TRANSMISSION DEVICE, POWER RECEPTION DEVICE AND POWER TRANSMISSION SYSTEM

(71) Applicant: TOSHIBA TEC KABUSHIKI KAISHA, Tokyo (JP)

(72) Inventor: Masakazu Kato, Numazu Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/438,996

(22) Filed: Jun. 12, 2019

(65) Prior Publication Data

US 2020/0021137 A1    Jan. 16, 2020

(30) Foreign Application Priority Data

Jul. 11, 2018  (JP) ................. 2018-131488

(51) Int. Cl.
*H02J 50/12* (2016.01)
*H02J 7/02* (2016.01)
*H02J 50/10* (2016.01)
*H02J 50/80* (2016.01)

(52) U.S. Cl.
CPC ............. *H02J 50/12* (2016.02); *H02J 7/025* (2013.01); *H02J 50/10* (2016.02); *H02J 50/80* (2016.02)

(58) Field of Classification Search
CPC .. H02J 50/10; H02J 50/12; H02J 50/80; H02J 7/025
USPC ...................................................... 307/104
See application file for complete search history.

(56) References Cited

U.S. PATENT DOCUMENTS

2012/0104867 A1*  5/2012  Mudrick ................. H02J 7/025
                                                         307/104
2013/0043951 A1   2/2013  Irish et al.

FOREIGN PATENT DOCUMENTS

| EP | 2 769 454 A2 | 8/2014 |
| JP | 2011-211874 A | 10/2011 |
| WO | WO-2018/064791 A1 | 4/2018 |

OTHER PUBLICATIONS

Extended European Search Report dated Dec. 4, 2019 issued in corresponding European Application No. 19185372.0, nine (9) pages.

* cited by examiner

*Primary Examiner* — Hal Kaplan
(74) *Attorney, Agent, or Firm* — Foley & Lardner LLP

(57) ABSTRACT

A power transmission device for use with a power reception device having a power reception coil includes a power transmission coil, a power transmission circuit, a communication circuit, and a control circuit. The power transmission coil is configured to be magnetically coupled to a power reception coil of a power reception device. The power transmission circuit includes a switching element and is configured to switch the switching element to apply alternating current to the power transmission coil. The communication circuit is configured to establish communication with the power reception device. The control circuit is configured to control switching of the power transmission circuit, determine whether or not a load of the power reception device is greater than a threshold based on an output voltage from the switching element and a determination criterion, and provide a notification to the power reception device from the communication circuit.

11 Claims, 10 Drawing Sheets

POWER TRANSMISSION DEVICE, POWER RECEPTION DEVICE AND POWER TRANSMISSION SYSTEM

CROSS-REFERENCE TO RELATED APPLICATION

This application is based upon and claims the benefit of priority from Japanese Patent Application No. 2018-131488, filed on Jul. 11, 2018, the entire contents of which are incorporated herein by reference.

FIELD

Embodiments described herein relate generally to a power transmission device, a power reception device, and a power transmission system.

BACKGROUND

A non-contact power transmission apparatus (non-contact power transmission system) that transmits electric power in a non-contact manner is becoming popular. The non-contact power transmission apparatus includes a non-contact power transmission device for supplying or transmitting electric power and a non-contact power reception device for receiving electric power supplied from the non-contact power transmission device. The non-contact power transmission device comprises a power transmission coil. The non-contact power reception device comprises a power reception coil that is magnetically coupled to the power transmission coil. The non-contact power transmission device and the non-contact power reception device respectively transmit and receive the electric power using the power transmission coil and the power reception coil according to principles such as electromagnetic induction or magnetic field resonance. The non-contact power reception device performs a charging process for charging a secondary battery mounted as a load using the electric power supplied from the non-contact power transmission device.

The non-contact power transmission device includes a power transmission circuit that controls a current flowing to the power transmission coil. An E-class amplifier using a switching element, such as a field-effect transistor (FET), is configured as the power transmission circuit. The power transmission circuit turns on or off the FET to apply an alternating current to the power transmission coil to transmit the electric power to the power reception coil. The power transmission circuit controls a timing at which the FET is turned on or off according to a load so that a voltage applied to the power transmission coil has an ideal waveform. In this application, the power transmission circuit can perform a zero voltage switching (ZVS) operation of switching a state of the FET from an OFF state to an ON state when the voltage applied to the power transmission coil becomes 0 Volts (V).

In a configuration as described in more detail herein, the non-contact power transmission device may transmit the electric power to the non-contact power reception device mounted with a load that exceeds the rating of the non-contact power transmission device in some applications. In such an application, there is a possibility that the ideal waveform cannot be obtained even if the timing at which the FET is turned on or off is controlled. Therefore, there is a possibility that a potential of a terminal of the FET does not become 0 V at the timing at which the state of the FET is switched from the OFF state to the ON state. As a result, a current flows to the FET and the FET generates heat. Many FETs deteriorate when heated. Therefore, deterioration of the FET is accelerated when the state of the FET is switched from the OFF state to the ON state.

DETAILED DESCRIPTION

In accordance with one embodiment, a power transmission device includes a power transmission coil that is magnetically coupled to a power reception coil of a power reception device; a power transmission circuit including a switching element and configured to switch the switching element to apply alternating current to the power transmission coil; a communication circuit configured to establish communication with the power reception device; and a control circuit configured to control switching of the power transmission circuit, determine whether or not a load of the power reception device is excessive based on an output voltage from the switching element and a preset determination criterion, and notify the power reception device that the load is excessive via the communication circuit if it is determined that the load of the power reception device is excessive.

An example of a power transmission device, a power reception device, and a power transmission system according to an embodiment are described with reference to the accompanying drawings.

First, an overview of the non-contact power transmission apparatus 1 is described.

Figure 1:
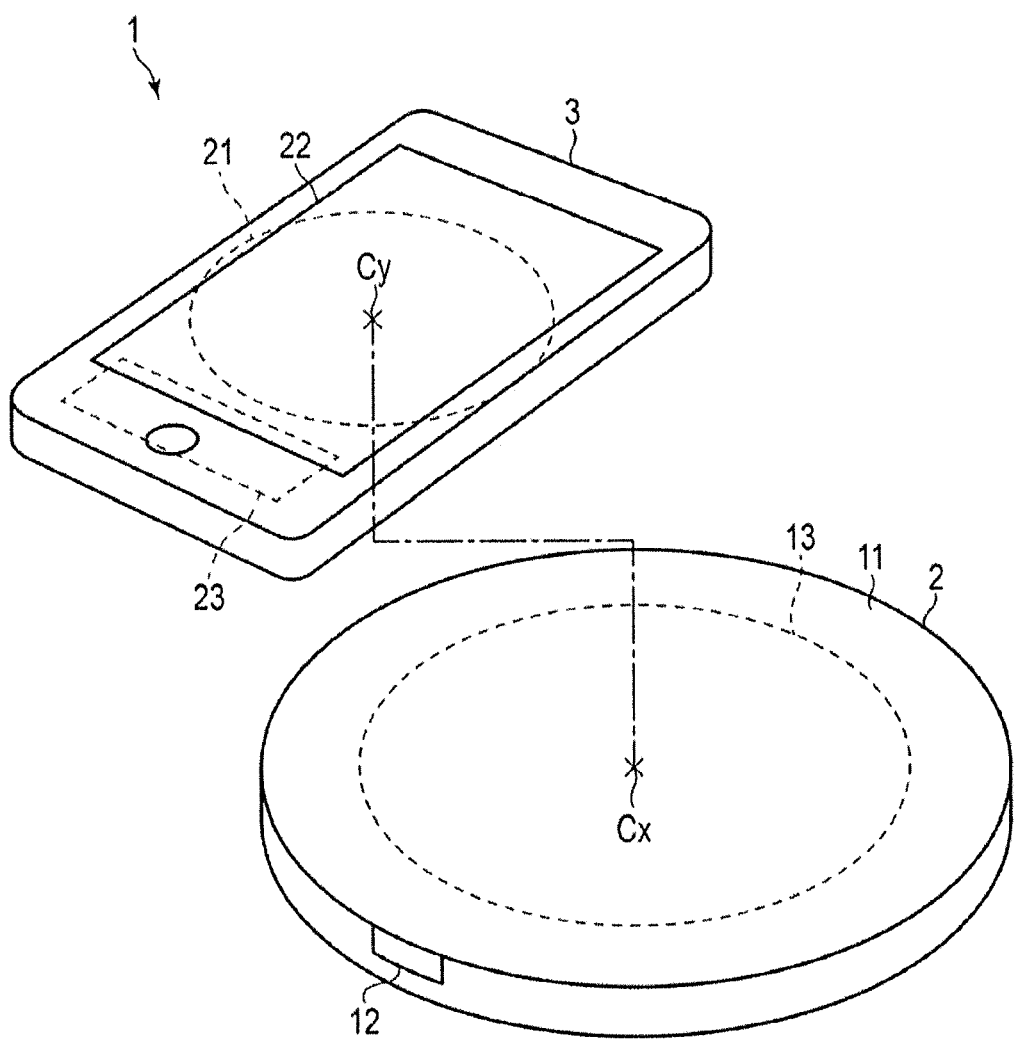
FIG. 1 is a diagram illustrating an example of a configuration of a non-contact power transmission apparatus according to an embodiment.

FIG. 1 is a diagram illustrating a configuration of a non-contact power transmission apparatus 1 according to an example embodiment.

The non-contact power transmission apparatus 1 is a power transmission system including a non-contact power transmission device 2 for supplying (transmitting) electric power and a non-contact power reception device 3 for receiving the electric power supplied from the non-contact power transmission device 2.

The non-contact power transmission device 2 supplies the electric power to the non-contact power reception device 3 through magnetic field coupling such as electromagnetic induction or magnetic field resonance (resonance). Specifically, the non-contact power transmission device 2 supplies the electric power to the non-contact power reception device 3 in a state in which it is not electrically connected to the non-contact power reception device 3 (i.e., a non-contact state). As shown in FIG. 1, the non-contact power transmission device 2 includes a power transmission stand 11, a display section 12 and a power transmission coil 13.

A part of a housing of the non-contact power transmission device 2 may be formed in a flat plate shape to include the power transmission stand 11. The power transmission coil 13 may be provided in the housing.

The display section 12 is an indicator (e.g., a LED (Light Emitting Diode), a display, etc.) that indicates the state of the non-contact power transmission device 2. The display section 12 may, for example, switch a display color according to an operation state of the non-contact power transmission device 2 (e.g., from red to green, etc.). In another example, the display section 12 may be utilized to display a message indicating an operation state. In yet another example, the display section 12 may blink at various frequencies to convey an indication of an operation state.

The power transmission coil 13 generates a magnetic field when applied with alternating current (AC) power. The power transmission coil 13 includes, for example, a resonant circuit (e.g., a power transmission resonant circuit, etc.) by being connected in series or in parallel with a capacitor (not shown). The power transmission coil 13 is disposed in parallel with a surface (e.g., placing surface, etc.) of the power transmission stand 11 on which the non-contact power reception device 3 may be placed. The power transmission coil 13 may have a winding structure in which an insulated wire is wound, or may be configured by forming a coil pattern on a printed substrate.

The non-contact power reception device 3 receives the electric power transmitted from the non-contact power transmission device 2. The non-contact power reception device 3 may function as a portable information terminal such as a smartphone, a tablet personal computer (PC), or a point of sale (POS) terminal, for example. The non-contact power reception device 3 may be connected to a power supply terminal of a portable information terminal such as a smartphone, a tablet PC, a POS terminal or the like to supply the electric power transmitted from the non-contact power transmission device 2 to the portable information terminal. As shown in FIG. 1, the non-contact power reception device 3 includes a power reception coil 21, a display section 22, and a secondary battery 23.

The power reception coil 21 generates a current based on a change in magnetic field thereof. The power reception coil 21 includes, for example, a resonance circuit (e.g., power reception resonance circuit, etc.) by being connected in series or in parallel with a capacitor (not shown). The power reception coil 21 is disposed in parallel with one of surfaces of the housing of the non-contact power reception device 3. The power reception coil 21 may have a winding structure in which an insulated wire is wound, or may be configured by forming a coil pattern on a printed substrate. When the non-contact power reception device 3 is placed on the power transmission stand 11 in a state in which a surface of the housing of the non-contact power reception device 3 on which the power reception coil 21 is provided is oriented to the placing surface of the power transmission stand 11, the power reception coil 21 is magnetically coupled to the power transmission coil 13 of the non-contact power transmission device 2.

The secondary battery 23 is charged by the electric power generated in the power reception coil 21 and supplies the electric power to each part of the non-contact power reception device 3.

The display section 22 is configured to display various kinds of information (e.g., data, messages, etc.). The display section 22 displays a screen under the control of a control circuit of the non-contact power reception device 3 or a graphic controller (not shown).

The non-contact power transmission device 2 generates a magnetic field in the power transmission coil 13 by supplying the AC power to the power transmission coil 13. When the magnetic field is generated in the power transmission coil 13 of the non-contact power transmission device 2, an induced current is generated in the power reception coil 21 magnetically coupled to the power transmission coil 13. The non-contact power reception device 3 uses the induced current generated in the power reception coil 21 to perform a charging process for charging the secondary battery 23. Thus, the non-contact power transmission apparatus 1 supplies the electric power to the non-contact power reception device 3 by enabling the power transmission coil 13 of the non-contact power transmission device 2 to generate the magnetic field.

The effect of the power transmission between the non-contact power transmission device 2 and the non-contact power reception device 3 is reduced according to a magnitude of a shift (e.g., position shift, etc.) amount between a center Cx of the power transmission coil 13 and a center Cy of the power reception coil 21. Therefore, it is preferable to place the non-contact power reception device 3 on the power transmission stand 11 in such a manner that there is no shift between the center Cx of the power transmission coil 13 and the center Cy of the power reception coil 21.

Next, detailed configurations of the non-contact power transmission device 2 and the non-contact power reception device 3 are described.

Figure 2:
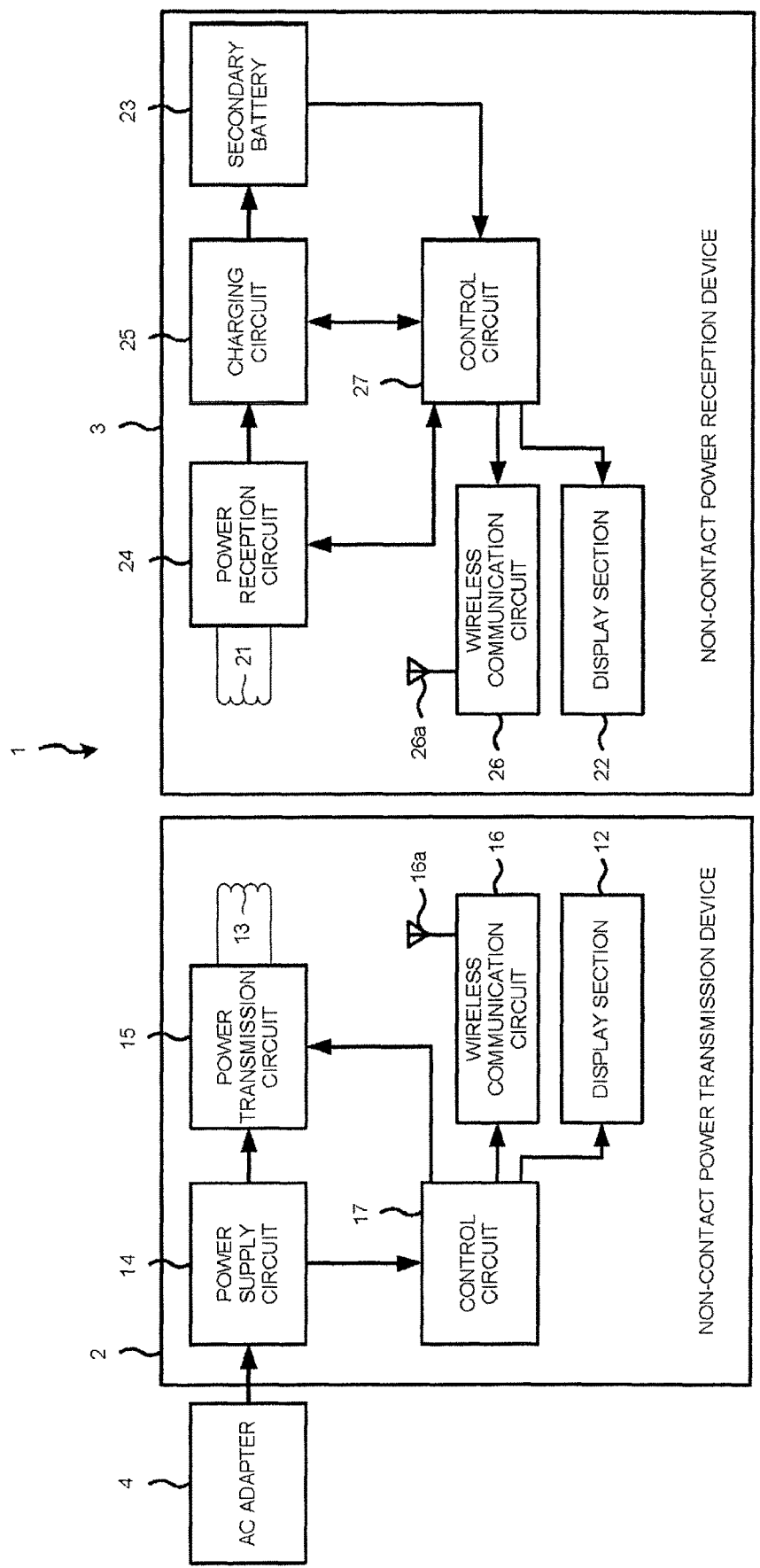
FIG. 2 is a diagram illustrating an example of a configuration of a non-contact power transmission device and a non-contact power reception device, according to the embodiment.

FIG. 2 is a diagram illustrating a configuration of the non-contact power transmission device 2 and the non-contact power reception device 3 of the non-contact power transmission apparatus 1, according to an example embodiment.

First, the non-contact power transmission device 2 is described.

The non-contact power transmission device 2 includes a power supply circuit 14, a power transmission circuit 15, a power transmission coil 13, a display section 12, a wireless communication circuit 16, and a control circuit 17.

The power supply circuit 14 converts a voltage of the external direct current (DC) power supply to a voltage suitable for the operation of each circuit, and supplies the converted voltage to the power transmission circuit 15 and the control circuit 17. The power supply circuit 14 converts DC power supplied from a commercial power supply via the AC adapter 4 to a voltage, and supplies the converted voltage to the power transmission circuit 15 and the control circuit 17. The power supply circuit 14 may acquire the DC power by rectifying and smoothing AC power supplied from a commercial power supply.

The power transmission circuit 15 may be an E-class amplifier circuit. The power transmission circuit 15 generates AC power by switching the DC power supplied from the power supply circuit 14 using the switching element (e.g., a FET, etc.) under the control of the control circuit 17. The power transmission circuit 15 generates a magnetic field in the power transmission coil 13 by supplying the AC power to the power transmission coil 13. The detailed configuration of the power transmission circuit 15 is described in more detail herein.

The wireless communication circuit 16 is an interface for performing wireless communication with the non-contact power reception device 3. The wireless communication circuit 16 is connected to an antenna 16a. The wireless communication circuit 16 performs wireless communication with the non-contact power reception device 3 via the antenna 16a at a frequency different from a power transmission frequency. The wireless communication circuit 16 is, for example, a wireless local area network (LAN) using a band of 2.4 gigahertz (GHz) or 5 GHz, a near field wireless communication device using a band of 920 megahertz (MHz), a communication device using infrared rays, or the like. The wireless communication circuit 16 may perform wireless communication with the non-contact power reception device 3 in conformity with a standard such as Bluetooth® technology or Wi-Fi® technology.

The wireless communication circuit 16 may perform signal processing for performing load modulation on a carrier wave for power transmission to communicate with the non-contact power reception device 3. In this application, the wireless communication circuit 16 is a part of the power transmission circuit 15.

The control circuit 17 controls operations of the display section 12, the power transmission circuit 15 and the wireless communication circuit 16, respectively. The control circuit 17 includes a processor and a memory. The processor is an arithmetic element that executes an arithmetic process. The processor performs various processes according to, for example, programs stored in the memory and data used in the programs. The memory stores programs and data used in the programs. The control circuit 17 may be a microcomputer and/or an oscillation circuit.

For example, the control circuit 17 switches the display (e.g., switches a color of the display, switches a message displayed on the display, etc.) of the display section 12 according to the operation state of the non-contact power transmission device 2. For example, the control circuit 17 communicates with the non-contact power reception device 3 via the wireless communication circuit 16.

For example, the control circuit 17 controls a timing for turning on or off the switching element of the power transmission circuit 15. Specifically, the control circuit 17 performs ON/OFF control for turning on or off the switching element of the power transmission circuit 15 at a frequency of about 100 kilohertz (kHz) to 200 kHz when the electromagnetic induction system is used for power transmission. The control circuit 17 performs ON/OFF control for turning on or off the switching element of the power transmission circuit 15 at a frequency of a MHz band such as 6.78 MHz or 13.56 MHz when the magnetic field resonance system is used for power transmission. The frequency of the ON/OFF control for the switching element of the power transmission circuit 15 is not limited to the above, and may be changed depending on the use of the non-contact power transmission device 2 and the non-contact power reception device 3.

For example, the control circuit 17 detects a current flowing to the power transmission coil 13 using a current detector (not shown), and performs a placement detection process of determining whether or not the non-contact power reception device 3 is placed on the power transmission stand 11 based on the detection result.

For example, the control circuit 17 performs an authentication process by transmitting and receiving information to and from the non-contact power reception device 3 via the wireless communication circuit 16. The authentication process is a process of determining whether or not the non-contact power reception device 3 is the correct device (e.g., an authentic device, an intended device, etc.) to which the non-contact power transmission device 2 can transmit the electric power.

Next, the non-contact power reception device 3 is described.

The non-contact power reception device 3 includes the power reception coil 21, the display section 22, the secondary battery 23, a power reception circuit 24, a charging circuit 25, a wireless communication circuit 26 and a control circuit 27. The non-contact power reception device 3 may include an output terminal for supplying the electric power to a load, instead of the secondary battery 23 and the charging circuit 25.

The power reception circuit 24 rectifies an induction current (e.g., AC power generated in the power reception coil 21, etc.) and converts it to DC power. The power reception circuit 24 includes, for example, a rectifying bridge including a plurality of diodes. A pair of input terminals of the rectifying bridge is connected to the power reception coil 21 (or a power reception resonant circuit). The rectifying bridge performs full-wave rectification on the current supplied from the power reception coil 21 to output the DC power from an output terminal thereof. The power reception circuit 24 may include a DC/DC converter that generates a DC voltage according to the specification of the charging circuit 25 or the control circuit 27 from the DC power output from the rectifying bridge.

The charging circuit 25 converts the DC power supplied from the power reception circuit 24 to DC power (e.g., charging power, etc.) used for the charging process. The charging circuit 25 controls values of a voltage and a current of the charging power according to a specification of the secondary battery 23. For example, the charging circuit 25 can increase or decrease a load amount occurring when the secondary battery 23 is charged (e.g., a load amount of the non-contact power reception device 3, etc.) by controlling the current value of the charging power. Specifically, the charging circuit 25 can increase the load amount of the non-contact power reception device 3 by increasing the current value of the charging power. The charging circuit 25 can decrease the load amount of the non-contact power reception device 3 by reducing the current value of the charging power. The charging circuit 25 increases or decreases the load amount of the non-contact power reception device 3 under the control of the control circuit 27.

The wireless communication circuit 26 performs wireless communication with the non-contact power transmission device 2. The wireless communication circuit 26 is connected to an antenna 26a. The antenna 26a is an antenna whose resonant frequency corresponds to that of the antenna 16a of the non-contact power transmission device 2. The wireless communication circuit 26 performs wireless communication at a frequency different from the power transmission frequency. The wireless communication circuit 26 is, for example, a wireless LAN using the band of 2.4 GHz or 5 GHz, a near field wireless communication device using the band of 920 MHz, a communication device using infrared rays, or the like. The wireless communication circuit 26 may perform wireless communication with the non-contact power transmission device 2 in conformity with standards such as Bluetooth® or Wi-Fi®.

The wireless communication circuit 26 may perform signal processing for performing load modulation on a carrier wave for power transmission to communicate with the non-contact power transmission device 2. In this application, the wireless communication circuit 26 is a part of the power reception circuit 24.

The control circuit 27 controls operations of the display section 22, the power reception circuit 24, the charging circuit 25 and the wireless communication circuit 26, respectively. The control circuit 27 includes a processor and a memory. The processor is an arithmetic element that executes an arithmetic process. The processor performs various processes according to, for example, programs stored in the memory and data used in the programs. The memory stores programs and data used in the programs.

For example, the control circuit 27 controls the display section 22 to display various kinds of information based on an operation state of the non-contact power reception device 3 and the information acquired from the non-contact power transmission device 2 via the wireless communication circuit 26.

For example, the control circuit 27 performs the authentication process by transmitting and receiving information to and from the non-contact power transmission device 2 via the wireless communication circuit 26. The authentication process is a process of determining whether or not the non-contact power transmission device 2 is the correct device suitable for transmitting the electric power to the non-contact power reception device 3.

For example, the control circuit 27 controls the operation of the charging circuit 25. The control circuit 27 controls the current value of the charging power for charging the secondary battery 23 by controlling the operation of the charging circuit 25. In other words, the control circuit 27 adjusts the load amount of the non-contact power reception device 3.

Next, detailed configurations of the power transmission circuit 15 and the control circuit 17 of the non-contact power transmission device 2 are described.

Figure 3:
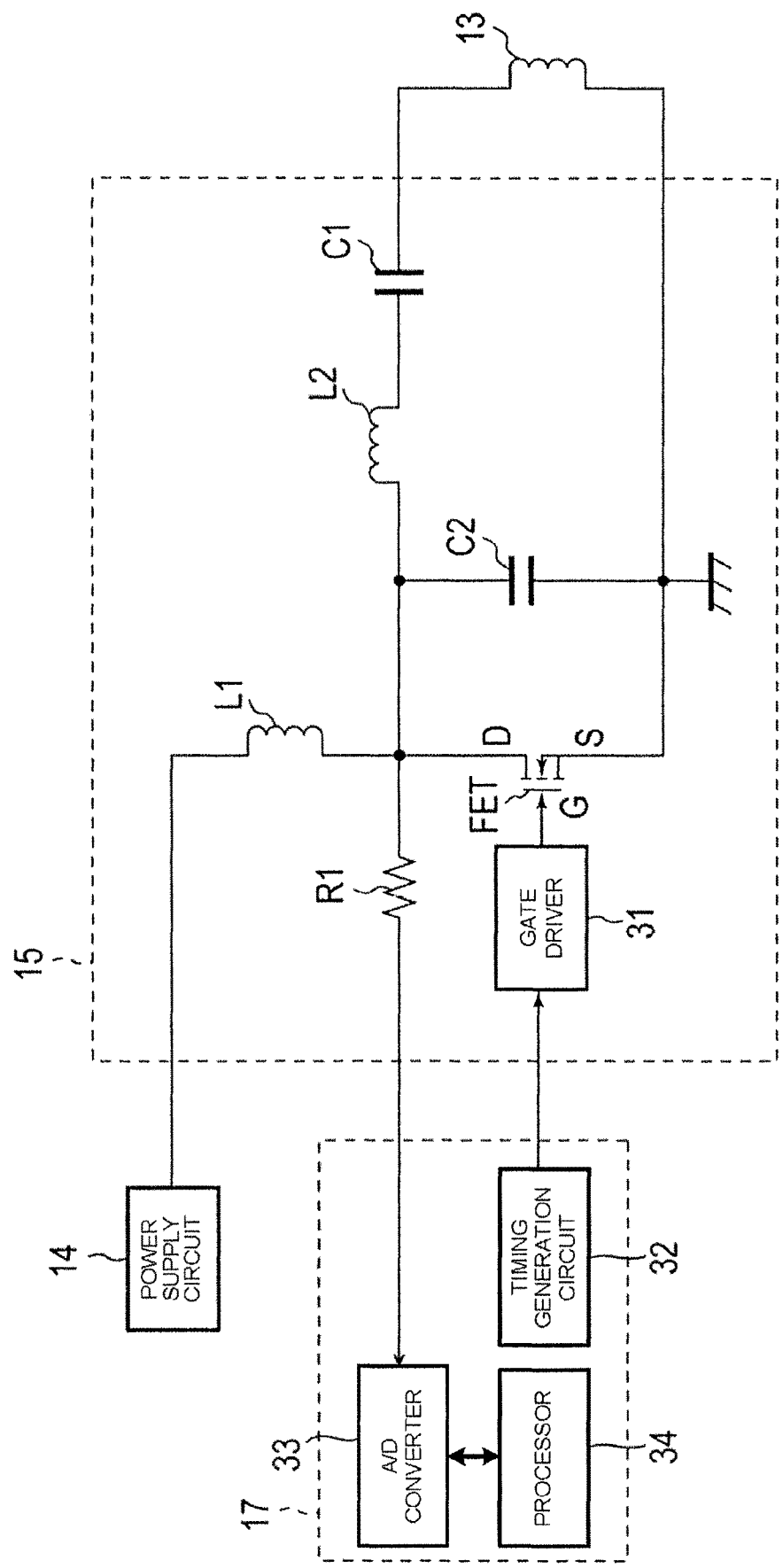
FIG. 3 is a diagram illustrating a detailed configuration of the non-contact power transmission device according to the embodiment.
Figure 4:
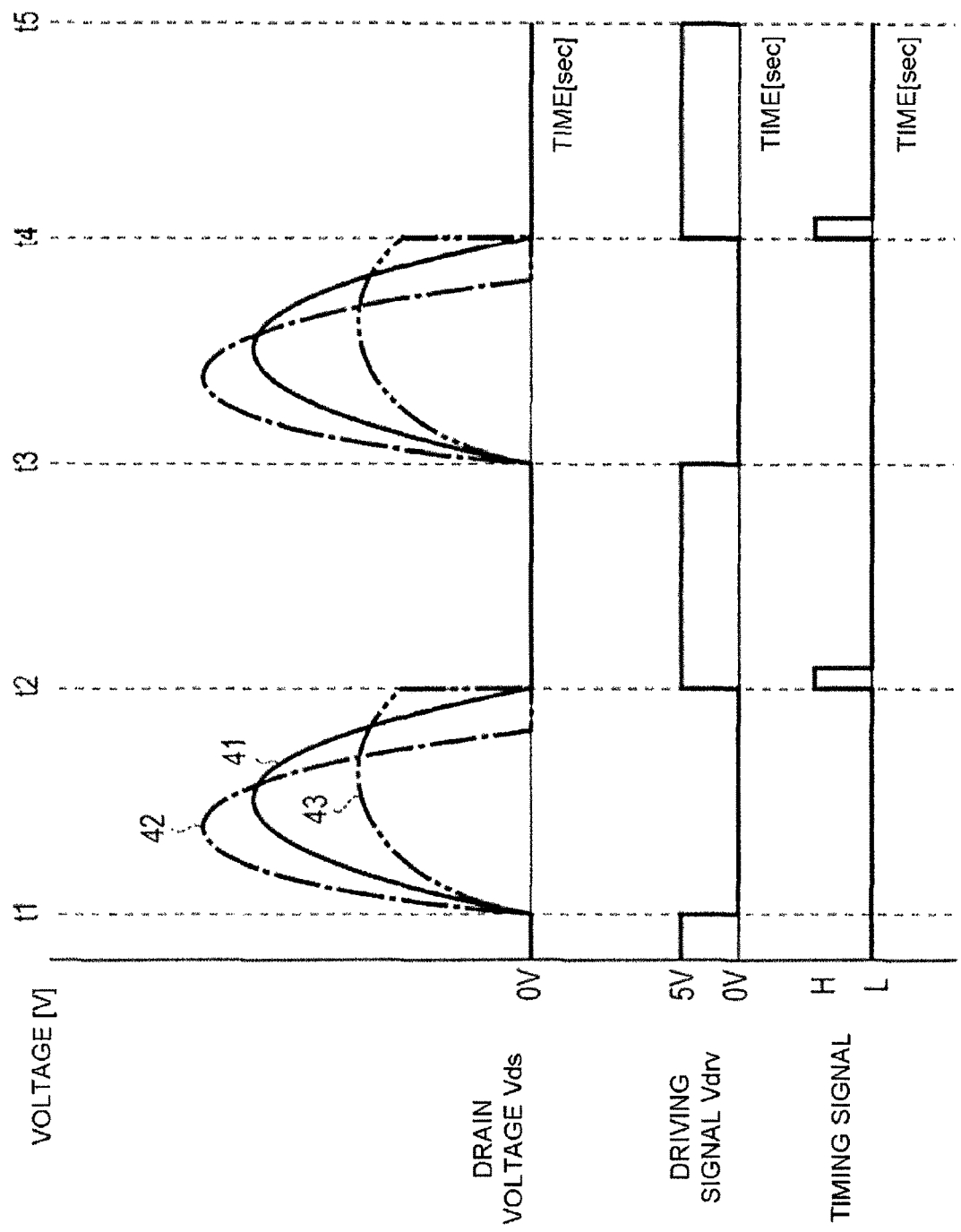
FIG. 4 is a graph illustrating an example of an operation performed by the non-contact power transmission device according to a first embodiment.

FIG. 3 is a diagram illustrating a configuration of the power transmission circuit 15 and the control circuit 17. FIG. 4 is a graph illustrating operations of the power transmission circuit 15 and the control circuit 17. As shown in FIG. 3, the power transmission circuit 15 includes the switching element, a first inductor L1, a second inductor L2, a first capacitor C1, a second capacitor C2, a resistor R1, and a gate driver 31. The control circuit 17 includes a timing generation circuit 32, an analog to digital (A/D) converter 33, and a processor 34.

The switching element switches a conduction path between an open state (e.g., OFF state, etc.) and a short circuit state (e.g., ON state, etc.). The switching element is, for example, a metal-oxide-semiconductor field-effect transistor (MOSFET). As shown in FIG. 3, the switching element is an N-channel MOSFET. Therefore, when an ON voltage is input to a gate terminal, the switching element enables conduction between a drain terminal and a source terminal. The switching element opens the conduction path between the drain terminal and the source terminal when the OFF voltage is input to the gate terminal. The switching element may be an insulated gate bipolar transistor (IGBT) or the like.

The source terminal of the switching element is connected to ground (GND).

The gate terminal of the switching element is connected to an output terminal of the gate driver 31.

The drain terminal of the switching element is connected to the power supply circuit 14 via the first inductor L1.

The drain terminal of the switching element is connected to the A/D converter 33 of the control circuit 17 via the resistor R1.

One terminal of the second capacitor C2 and one terminal of the second inductor L2 are connected in parallel to the drain terminal of the switching element. The other terminal of the second capacitor C2 is connected to the GND. The other terminal of the second inductor L2 is connected to one terminal of the first capacitor C1. The other terminal of the first capacitor C1 is connected to one terminal of the power transmission coil 13. The other terminal of the power transmission coil 13 is connected to the GND. In other words, the second capacitor C2 and a series connection of the power transmission coil 13, the first capacitor C1 and the second inductor L2 are connected in parallel between the drain terminal and the source terminal of the switching element.

In the power transmission circuit 15, the second inductor L2 and the second capacitor C2 may be omitted. However, the power transmission circuit 15 is provided with the second inductor L2 and the second capacitor C2, and in this way, the operation of the power transmission circuit 15 is stabilized, and radiation noise (e.g., electromagnetic interference (EMI), etc.) can be reduced.

The timing generation circuit 32 generates a signal indicating a timing at which the switching element is turned on or off. In other words, the timing generation circuit 32 generates a clock having the power transmission frequency. For example, the timing generation circuit 32 generates a signal (e.g., timing signal, etc.) indicating a timing at which the switching element is turned on, and supplies the timing signal to the gate driver 31 and the processor 34.

The gate driver 31 generates a signal (e.g., driving signal Vdrv, etc.) for switching the state of the switching element between the ON state and the OFF state based on the timing signal from the timing generation circuit 32. The gate driver 31 inputs the generated driving signal Vdrv to the gate terminal of the switching element.

The driving signal Vdrv is used for switching the voltage required to switch the state of the switching element between the ON state and the OFF state according to the power transmission frequency. For example, when the switching element is turned on at a voltage (ON voltage) of 5 V (or 10 V) and turned off at a voltage (OFF voltage) of 0 V, the driving signal Vdrv is used for switching the ON voltage and the OFF voltage according to the power transmission frequency. The signal generated by the timing generation circuit 32 is output through the gate driver 31 as the driving signal Vdrv. Therefore, the driving signal Vdrv is slightly delayed (e.g., by several nanoseconds (ns), etc.) from the signal generated by the timing generation circuit 32.

The A/D converter 33 performs A/D conversion on a value of a voltage (e.g., drain voltage Vds, etc.) generated at the drain terminal of the switching element via the resistor R1. Specifically, the A/D converter 33 detects the drain voltage Vds which is an output voltage of the switching element. The A/D converter 33 transmits a voltage value of the drain voltage Vds to the processor 34.

The processor 34 acquires the voltage value of the drain voltage Vds from the A/D converter 33 at a predetermined timing. The processor 34 acquires the voltage value of the drain voltage Vds from the A/D converter 33 at the timing at which the switching element is turned on based on the timing signal supplied from the timing generation circuit 32.

Based on the acquired drain voltage Vds, the processor 34 performs a load amount determination process for determining whether or not the load connected to the power transmission coil 13 (e.g., the load amount of the non-contact power reception device 3, etc.) is appropriate. The processor 34 transmits a message to the non-contact power reception device 3 based on the result of the load amount determination process.

FIG. 4 shows a graph displaying an example of the drain voltage Vds, the driving signal Vdrv, and the timing signal. FIG. 4 illustrates an application in which the switching element is in the OFF state from a timing t1 to a timing t2, the switching element is in the ON state from the timing t2 to a timing t3, the switching element is in the OFF state from the timing t3 to a timing t4, and the switching element is in the ON state from the timing t4 to a timing t5.

The timing signal has a waveform that rises at the timing t2 and the timing t4.

A graph 41, a graph 42 and a graph 43 in FIG. 4 each show a change of the drain voltage Vds at the time a non-contact power reception device 3 is connected.

At the timing t1, when the driving signal Vdrv changes from the ON voltage to the OFF voltage and the conduction path between the drain terminal and the source terminal of the switching element is in the open state, the drain voltage Vds of the switching element gradually rises.

The change of the drain voltage Vds after the conduction path between the drain terminal and the source terminal of the switching element is in the open state is different depending on the load amount of the non-contact power reception device 3. The change of the drain voltage Vds after the conduction path between the drain terminal and the source terminal of the switching element is in the open state is also different depending on a coupling coefficient k between the power transmission coil 13 and the power reception coil 21. In other words, the change of the drain voltage Vds after the conduction path between the drain terminal and the source terminal of the switching element is in the open state is determined by the load amount of the non-contact power reception device 3 and the coupling coefficient k. When the load amount of the non-contact power reception device 3 and the coupling coefficient k are ideal, the change of the drain voltage Vds is represented by an ideal waveform. When the load amount of the non-contact power reception device 3 or the coupling coefficient k are different from ideal values thereof, the change of the drain voltage Vds is represented by a curve different from the ideal waveform.

When the non-contact power reception device 3 is properly positioned with respect to the non-contact power transmission device 2, it is assumed that the power transmission coil 13 and the power reception coil 21 are coupled at a certain coupling coefficient. The power transmission coil 13, the power transmission circuit 15, the power reception coil 21 and the power reception circuit 24 are designed in such a manner that ZVS operation is performed at the assumed coupling coefficient. For example, when the coupling coefficient k between the power transmission coil 13 and the power reception coil 21 is larger than the assumed coupling coefficient, the drain voltage Vds at the switching timing is increased. For example, when the coupling coefficient k between the power transmission coil 13 and the power reception coil 21 is smaller than the assumed coupling coefficient, the drain voltage Vds becomes 0 V earlier than the switching timing.

The graph 41 shows the change of the drain voltage Vds when the load amount of the non-contact power reception device 3 and the coupling coefficient k are ideal. As shown in the graph 41, when the load amount of the non-contact power reception device 3 and the coupling coefficient k are ideal, the drain voltage Vds gradually rises at the timing t1, and an inclination becomes negative in the vicinity of the middle between the timing t1 and the timing t2. Furthermore, the drain voltage Vds becomes 0 V at the timing t2 at which the conduction path between the drain terminal and the source terminal of the switching element is conducted, which is a state of a so-called ZVS. In this application, when the conduction path between the drain terminal and the source terminal of the switching element is conducted at the timing t2, the drain voltage Vds becomes 0 V. For this reason, no loss occurs due to the switching of the switching element, and the switching is performed with high efficiency.

The graph 42 shows an example in which the coupling coefficient k or the load amount of the non-contact power reception device 3 is smaller with respect to that in the graph 41. Specifically, the graph 42 shows the change of the drain voltage Vds when the load amount of the non-contact power reception device 3 or the coupling coefficient k is insufficient. In the example of the graph 42, the drain voltage Vds gradually rises at the timing t1, and the inclination becomes negative at a timing earlier than the middle between the timing t1 and the timing t2. Furthermore, the drain voltage Vds becomes 0 V earlier than the timing t2 at which the conduction path between the drain terminal and the source terminal of the switching element is conducted. Furthermore, the drain voltage Vds becomes a slightly negative potential (e.g., about 0.7 V, etc.) at the timing t2. Therefore, when the conduction path between the drain terminal and the source terminal of the switching element is conducted at the timing t2, the current flows from the source terminal to the drain terminal, which causes the loss.

The graph 43 shows an example in which the coupling coefficient k or the load amount of the non-contact power reception device 3 is larger with respect to that in the graph 41. Specifically, the graph 43 shows the change of the drain voltage Vds when the load amount of the non-contact power reception device 3 or the coupling coefficient k is excessive. In the example of the graph 43, the drain voltage Vds gradually rises at the timing t1, and the inclination becomes negative at a timing later than the middle between the timing t1 and the timing t2. The inclination of the drain voltage Vds may not become negative between the timing t1 and the timing t2. In such an application, the drain voltage Vds has a value larger than 0 V at the timing t2 at which the conduction path between the drain terminal and the source terminal of the switching element is conducted. In other words, Vds>0 V. Therefore, when the conduction path between the drain terminal and the source terminal of the switching element is conducted at the timing t2, a large current (e.g., through current, etc.) flows from the drain terminal to the source terminal, which causes the loss. In this application, the switching element generates heat, which may lead to deterioration of the switching element.

As described in more detail herein, if the load amount of the non-contact power reception device 3 or the coupling coefficient k is not ideal (e.g., appropriate, suitable, etc.), the loss may occur due to the switching. In particular, if the load amount of the non-contact power reception device 3 or the coupling coefficient k is excessive, the through current may occur, resulting in deterioration of the switching element. Therefore, the processor 34 performs the load amount determination process to avoid the state as shown by the graph 42 or the graph 43 described in more detail herein, and transmits a message to the non-contact power reception device 3.

First Embodiment

The load amount determination process according to a first embodiment is described in more detail herein.

The load amount determination process is a process of determining whether or not the ZVS is normally performed. The processor 34 acquires the drain voltage Vds at a timing (e.g., determination timing, etc.) decided based on the timing at which the conduction path between the drain terminal and the source terminal of the switching element is conducted. The processor 34 compares the acquired drain voltage Vds with a preset determination criterion. The processor 34 determines whether or not the ZVS is normally performed based on the comparison result.

The change of the drain voltage Vds depends on the actual load of the non-contact power reception device 3 for the non-contact power transmission device 2. The actual load of the non-contact power reception device 3 for the non-contact power transmission device 2 depends on the load amount of the non-contact power reception device 3 and the coupling coefficient k. If the actual load of the non-contact power reception device 3 is appropriate, the ZVS is performed normally, as described in more detail herein. In other words, the load amount determination process is a process of determining whether or not the actual load of the non-contact power reception device 3 for the non-contact power transmission device 2 is appropriate. More specifically, the load amount determination process is process of determining whether or not the load amount of the non-contact power reception device 3 or the coupling coefficient k is larger than the appropriate value (e.g., the actual load of the non-contact power reception device 3 is excessive, etc.).

The determination timing is, for example, the timing at which the conduction path between the drain terminal and the source terminal of the switching element is conducted, or a timing that is a predetermined time earlier than the timing at which the conduction path between the drain terminal and the source terminal of the switching element is conducted. The determination timing is at least later than the middle between the timing t1 at which the switching element is turned off and the timing t2 at which the switching element is turned on.

The determination criterion is, for example, a preset value (e.g., threshold value, etc.). If the drain voltage Vds acquired at the determination timing is less than the threshold value, the processor 34 determines that the ZVS is normally performed. If the drain voltage Vds acquired at the determination timing is equal to or larger than the threshold value, the processor 34 determines that the ZVS is not normally performed. Specifically, when the drain voltage Vds acquired at the determination timing is equal to or larger than the threshold value, the processor 34 determines that the actual load of the non-contact power reception device 3 is excessive. For example, the threshold value is set to a value that does not cause a problem in the heat even if there is a loss. For example, if it is assumed that the maximum voltage value when the drain voltage Vds has the ideal waveform is 100 V, it is desirable that the threshold value is set to 5 V to 10 V (e.g., 5% to 10% of the maximum voltage value, etc.).

Specifically, the determination timing is a timing immediately before the timing at which the conduction path between the drain terminal and the source terminal of the switching element is conducted. The threshold value is y [V]. In this application, the processor 34 acquires the drain voltage Vds at the timing immediately before the timing at which the conduction path between the drain terminal and the source terminal of the switching element is conducted. Furthermore, the processor 34 determines that the ZVS is normally performed when the acquired drain voltage Vds satisfies that Vds<y. If the acquired drain voltage Vds does not satisfy that Vds<y, the processor 34 determines that the actual load of the non-contact power reception device 3 is excessive and the ZVS is not normally performed.

The processor 34 creates a message based on the result of the load amount determination process described in more detail herein, and transmits the created message to the non-contact power reception device 3. For example, if the drain voltage Vds is less than the threshold value, the processor 34 transmits a message indicating that the load amount of the non-contact power reception device 3 and the coupling coefficient k are appropriate to the non-contact power reception device 3. When the drain voltage Vds is equal to or larger than the threshold value, the processor 34 transmits a message indicating that the load amount of the non-contact power reception device 3 and the coupling coefficient k are excessive to the non-contact power reception device 3.

Next, the operation performed by the non-contact power transmission device 2 configured as described in more detail herein is described.

Figure 5:
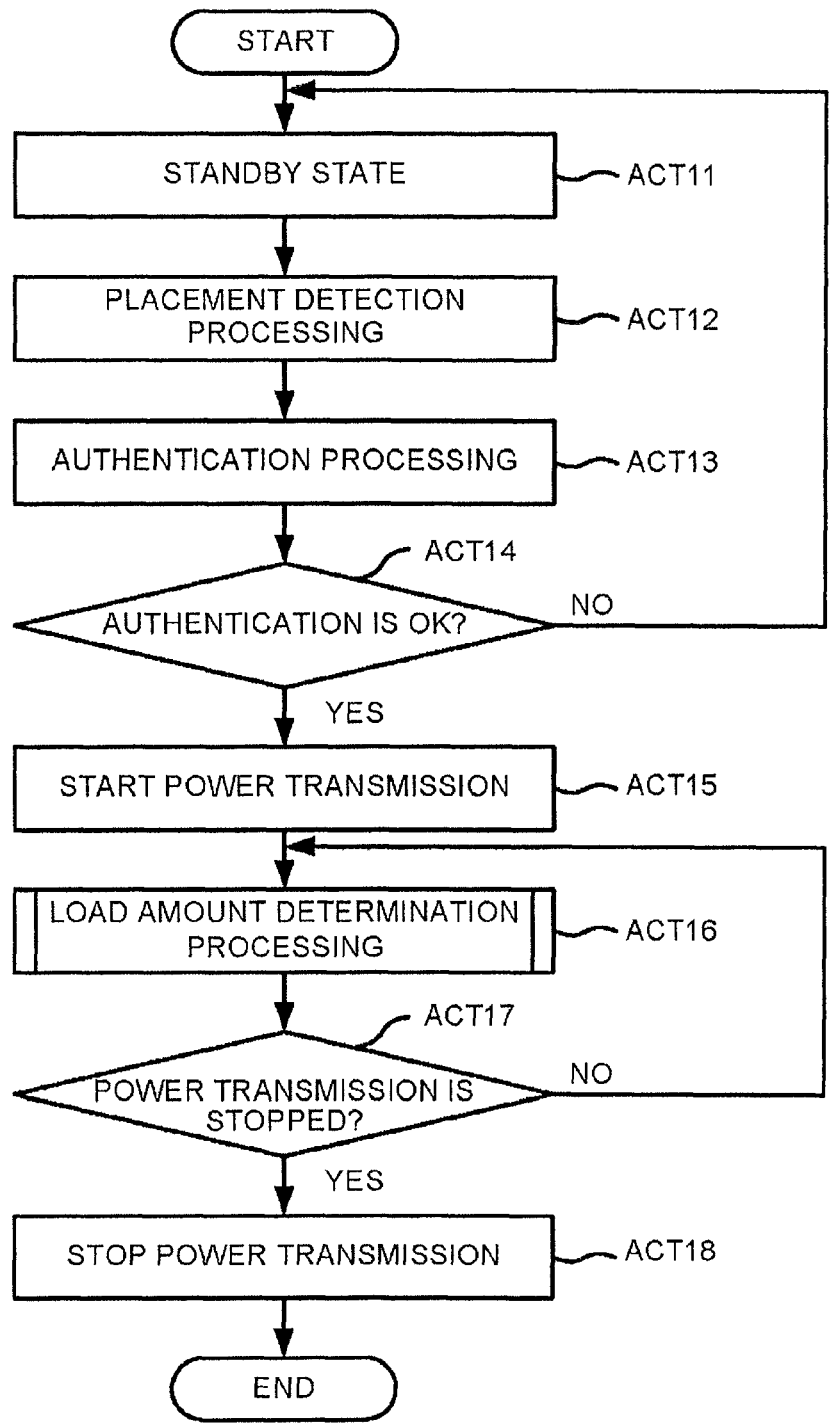
FIG. 5 is a diagram illustrating an example of an operation performed by the non-contact power transmission device according to the first embodiment.

FIG. 5 is a block diagram depicting an example of the operation performed by the non-contact power transmission device 2.

When the non-contact power transmission device 2 is started, the non-contact power transmission device 2 operates in a standby state (ACT 11). At this time, the control circuit 17 performs control to operate the power transmission circuit 15 at regular intervals. In this way, the power transmission circuit 15 intermittently supplies the electric power to the power transmission coil 13.

The control circuit 17 performs a placement detection process while transmitting the electric power intermittently (ACT 12). The placement detection process is a process of determining whether or not the non-contact power reception device 3 to which the electric power is to be supplied is placed on the power transmission stand 11. The control circuit 17 of the non-contact power transmission device 2 determines whether or not the non-contact power reception device 3 to which the electric power is to be supplied is placed on the power transmission stand 11 based on the detection result of a current detection circuit (not shown) for detecting the current supplied from the power transmission circuit 15 to the power transmission coil 13. Alternatively, the control circuit 17 may determine whether or not the non-contact power reception device 3 to which the electric power is to be supplied is placed on the power transmission stand 11 based on the detection result of the current detection circuit (not shown) for detecting the current supplied from the power supply circuit 14 to the power transmission circuit 15.

For example, in the standby state, the control circuit 17 controls the power transmission circuit 15 to intermittently supply the electric power to the power transmission coil 13. The control circuit 17 determines that the non-contact power reception device 3 is placed on the power transmission stand 11 if the detection result of the current detection circuit is increased while the power transmission circuit 15 supplies the electric power to the power transmission coil 13.

If it is determined that the non-contact power reception device 3 is placed on the power transmission stand 11, the control circuit 17 performs the authentication process (ACT 13). The authentication process is a process of determining whether or not the power transmission device 2 is the correct device to transmit the electric power to the non-contact power reception device 3, and vice versa. The non-contact power transmission device 2 and the non-contact power reception device 3 mutually transmit and receive predetermined information, and in this way, the authentication process can be performed For example, the authentication process is a process in which the non-contact power transmission device 2 determines whether or not the non-contact power reception device 3 placed on the power transmission stand 11 is a correct device. For example, the control circuit 17 of the non-contact power transmission device 2 acquires authentication information from the non-contact power reception device 3 via the wireless communication circuit 16. The authentication information includes identification information, a model number, a corresponding power transmission system, a corresponding frequency, and the like of the non-contact power reception device 3. The control circuit 17 compares the acquired authentication information with the information recorded in the memory to determine whether or not the non-contact power reception device 3 placed on the power transmission stand 11 is the correct device to which the non-contact power transmission device 2 can transmit the electric power. The authentication information may be only identification information of the non-contact power transmission device 2 or the non-contact power reception device 3, or may be other information.

The authentication process may be a process in which the non-contact power reception device 3 determines whether or not the non-contact power transmission device 2 having the power transmission stand 11 mounted thereon is the correct device. In this application, the control circuit 27 of the non-contact power reception device 3 acquires authentication information from the non-contact power transmission device 2 via the wireless communication circuit 26. The authentication information includes identification information, a model number, a corresponding power transmission system, a corresponding frequency, and the like of the non-contact power transmission device 2. The control circuit 27 compares the acquired authentication information with the information stored in the memory to determine whether or not the non-contact power transmission device 2 is the correct device for the non-contact power reception device 3.

The control circuit 17 determines whether or not the result of the authentication process is normal (whether or not the authentication result is OK) (ACT 14). If it is determined that the authentication process is not normally performed (the authentication result is NG) (No in ACT 14), the control circuit 17 returns to the process in ACT 11.

If it is determined that the authentication process is normally performed (Yes in ACT 14), the control circuit 17 controls the power transmission circuit 15 to supply the electric power to the power transmission coil 13 to start power transmission to the non-contact power reception device 3 (ACT 15).

During power transmission to the non-contact power reception device 3, the processor 34 of the control circuit 17 performs the above-mentioned load amount determination process (ACT 16). In this way, the processor 34 determines whether or not the actual load of the non-contact power reception device 3 is excessive, and transmits a message to the non-contact power reception device 3 based on the determination result.

The control circuit 17 determines whether to stop power transmission to the non-contact power reception device 3 (ACT 17). For example, based on a current value to be supplied to the power transmission coil 13 from the power transmission circuit 15, the control circuit 17 sequentially determines whether or not the non-contact power reception device 3 is removed from the power transmission stand 11 during the power transmission. If it is determined that the non-contact power reception device 3 is removed from the power transmission stand 11, the control circuit 17 determines to stop the power transmission. The control circuit 17 may also determine to stop the power transmission if information for instructing to stop the power transmission is supplied from the non-contact power reception device 3.

If it is determined not to stop the power transmission to the non-contact power reception device 3 (No in ACT 17), the control circuit 17 returns to the process in ACT 16 to perform the load amount determination process again.

If it is determined to stop the power transmission to the non-contact power reception device 3 (Yes in ACT 17), the control circuit 17 stops the power transmission to the non-contact power reception device 3 (ACT 18), and then terminates the process.

The control circuit 17 operates the power transmission circuit 15 to resume the power transmission if information for instructing to resume the power transmission is supplied from the non-contact power reception device 3 after the power transmission is stopped.

Figure 6:
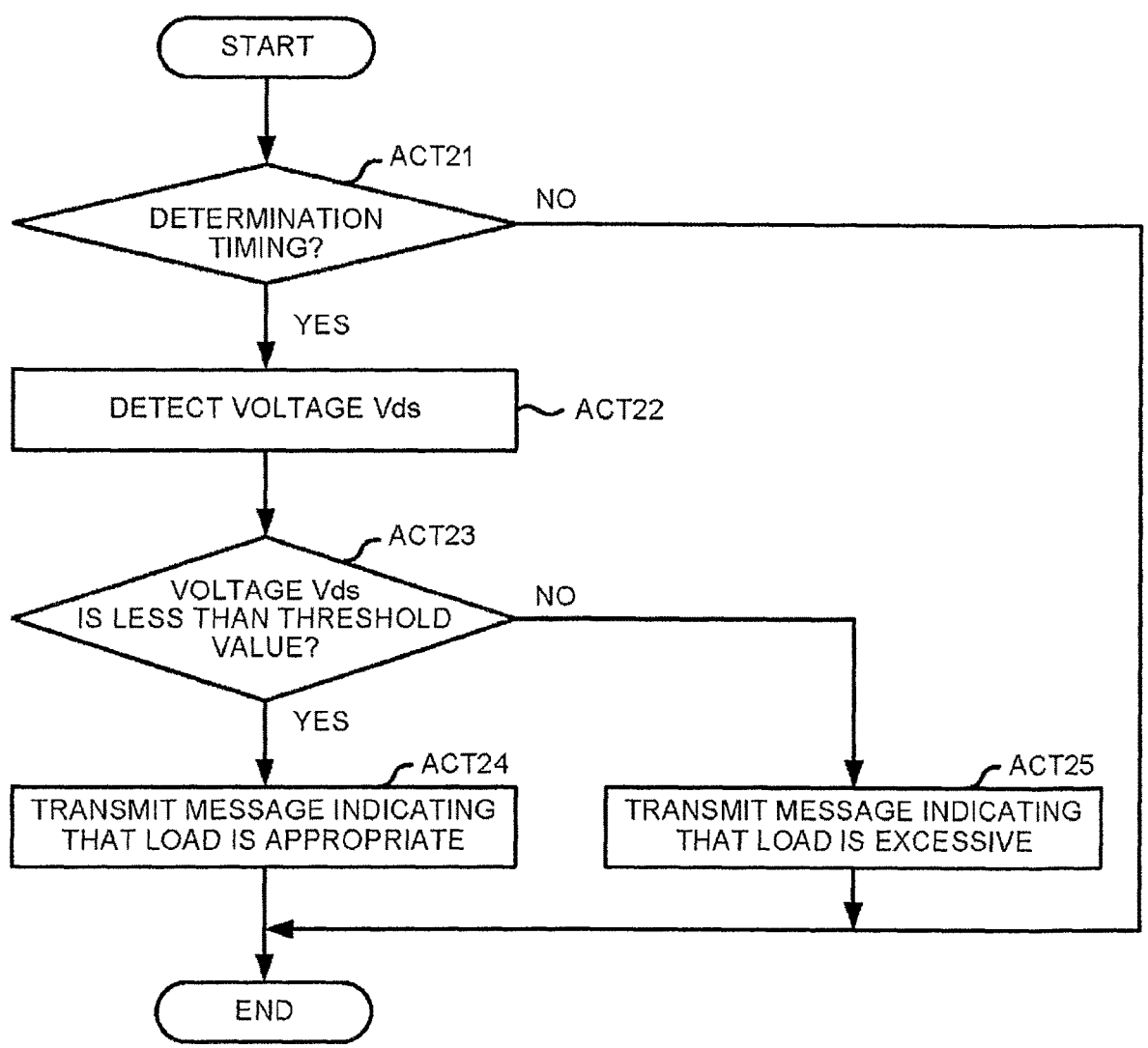
FIG. 6 is a diagram illustrating an example of an operation performed by the non-contact power transmission device according to the first embodiment.

FIG. 6 is a flowchart depicting an example of the load amount determination process in the non-contact power transmission device 2.

First, the processor 34 determines whether or not the determination timing arrives (e.g., has elapsed, has occurred, etc.) (ACT 21). As described in more detail herein, the processor 34 determines whether or not the timing at which the conduction path between the drain terminal and the source terminal of the switching element is conducted or a timing that is a predetermined time earlier than the timing at which the conduction path between the drain terminal and the source terminal of the switching element is conducted arrives. If it is determined that the determination timing does not arrive yet (No in ACT 21), the processor 34 terminates the load amount determination process, and then proceeds to the process in ACT 17 in FIG. 5.

If it is determined that the determination timing arrives (Yes in ACT 21), the processor 34 acquires the drain voltage Vds (ACT 22).

The processor 34 determines whether or not the acquired drain voltage Vds is less than the threshold value (ACT 23). If the drain voltage Vds is less than the threshold value, the processor 34 determines that the actual load of the non-contact power reception device 3 is appropriate and that the ZVS is normally performed. If the drain voltage Vds is equal to or larger than the threshold value, the processor 34 determines that the actual load of the non-contact power reception device 3 is excessive and that the ZVS is not performed normally.

If it is determined that the acquired drain voltage Vds is less than the threshold value (Yes in ACT 23), the processor 34 transmits a message indicating that the load is appropriate to the non-contact power reception device 3 (ACT 24), and then terminates the load amount determination process. If it is determined that the acquired drain voltage Vds is less than the threshold value, the processor 34 may terminate the load amount determination process without transmitting the message to the non-contact power reception device 3.

If it is determined that the acquired drain voltage Vds is equal to or larger than the threshold value (No in ACT 23), the processor 34 transmits a message indicating that the load is excessive to the non-contact power reception device 3 (ACT 25), and then terminates the load amount determination process.

Next, the operation performed by the non-contact power reception device 3 configured as described in more detail herein is described.

Figure 7:
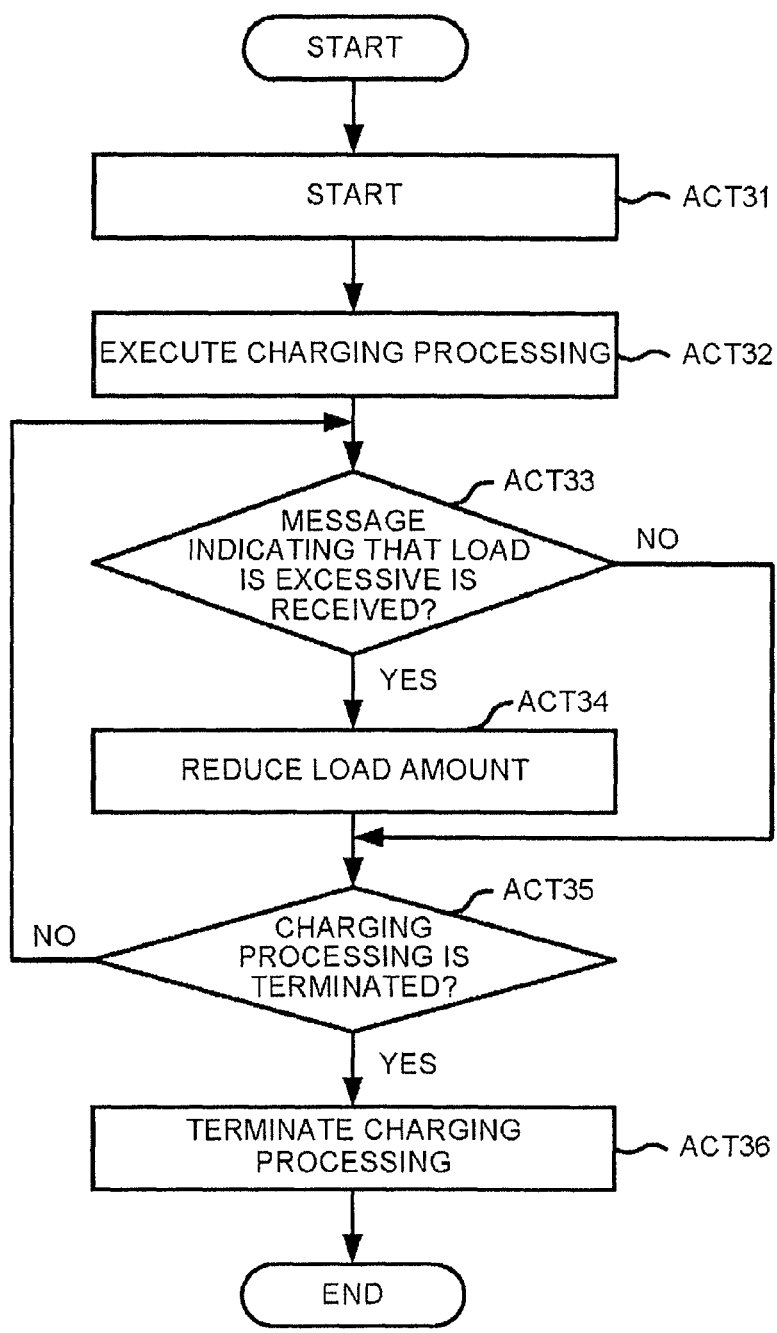
FIG. 7 is a diagram illustrating an example of an operation performed by the non-contact power reception device according to the first embodiment.

FIG. 7 is a block diagram depicting an example of the operation performed by the non-contact power reception device 3.

The non-contact power reception device 3 is started by the electric power supplied from the non-contact power transmission device 2 when placed on the power transmission stand 11 of the non-contact power transmission device 2 (ACT 31).

When started, the control circuit 27 of the non-contact power reception device 3 controls the charging circuit 25 to convert the DC power supplied from the power reception circuit 24 to the charging circuit 25 to charging power used for the charging process, and executes the charging process for supplying the charging power to the secondary battery 23 (ACT 32).

The control circuit 27 determines whether or not the message indicating that the load is excessive is received (ACT 33). If it is determined that the message indicating that the load is excessive is received (Yes in ACT 33), the control circuit 27 performs control to reduce the load amount of the non-contact power reception device 3 (ACT 34). In other words, the message indicating that the load is excessive plays a role of a command for instructing to reduce the load amount of the non-contact power reception device 3.

For example, the control circuit 27 reduces the load amount generated due to the charging to the secondary battery 23 by reducing the current value of the charging power. For example, when the load changes due to the voltage applied to the secondary battery 23, the control circuit 27 may reduce the load amount generated due to the charging to the secondary battery 23 by reducing the voltage value of the charging power.

For example, the control circuit 27 may turn off the display section 22 to reduce the load amount of the non-contact power reception device 3. Furthermore, the control circuit 27 may switch an operation mode of the control circuit 27 to a power saving mode that consumes less power than a normal mode to reduce the load amount of the non-contact power reception device 3.

If the message indicating that the load is excessive is not received (No in ACT 33) or the message indicating that the load is appropriate is received, the control circuit 27 proceeds to the process in ACT 35 described in more detail herein.

The control circuit 27 determines whether to terminate the charging process (ACT 35). For example, the control circuit 27 monitors a state of charging to the secondary battery 23 to determine whether or not the secondary battery 23 is fully charged. If it is determined that the secondary battery 23 is fully charged, the control circuit 27 determines to terminate the charging process.

If it is determined not to terminate the charging process (No in ACT 35), the control circuit 27 returns to the process in ACT 33 to again determine whether or not the message indicating that the load is excessive is received. Specifically, the control circuit 27 sequentially determines whether or not the message indicating that the load is excessive is received during the charging process. Furthermore, if the message indicating that the load is excessive is received, the control circuit 27 performs control to reduce the load amount of the non-contact power reception device 3. In this way, the non-contact power reception device 3 performs control to so that the load amount thereof becomes an appropriate load for the non-contact power transmission device 2.

If it is determined to terminate the charging process (Yes in ACT 35), the control circuit 27 terminates the charging process (ACT 36), and thus terminates the process in FIG. 7.

As described in more detail herein, the non-contact power transmission device 2 includes the power transmission coil 13 magnetically coupled to the power reception coil 21 of the non-contact power reception device 3, the power transmission circuit 15 for enabling the alternating current to flow to the power transmission coil 13 by switching the switching element, and the control circuit 17. The control circuit 17 controls the switching of the power transmission circuit 15 to supply the electric power to the non-contact power reception device 3. The control circuit 17 acquires the drain voltage Vds which is an output voltage of the switching element. The control circuit 17 determines whether or not the load of the non-contact power reception device 3 is excessive based on the acquired drain voltage Vds and the preset determination criterion. Furthermore, if it is determined that the load of the non-contact power reception device 3 is excessive, the control circuit 17 controls the wireless communication circuit 16 to notify the non-contact power reception device 3 of the message indicating that the load is excessive. The control circuit 27 of the non-contact power reception device 3 receiving the message indicating that the load is excessive performs control to reduce the load of the non-contact power reception device 3.

Thus, the non-contact power transmission device 2 can request the non-contact power reception device 3 having a load exceeding the rating of the non-contact power transmission device 2 to perform control so as to reduce the load amount thereof to the appropriate value. As a result, the non-contact power transmission device 2 can prevent the through current from flowing to the switching element of the power transmission circuit 15.

The control circuit 17 determines whether or not the drain voltage Vds is equal to or larger than the determination criterion at the timing at which the switching element is turned on based on the drain voltage Vds acquired at the above determination timing. In other words, the control circuit 17 determines whether or not the ZVS is performed. The control circuit 17 determines that the load of the non-contact power reception device 3 is excessive if it is determined that the drain voltage Vds is equal to or larger than the determination criterion at the timing at which the switching element is turned on.

Specifically, the control circuit 17 acquires the drain voltage Vds at a timing that is a predetermined time earlier than the timing at which the switching element is turned on. The control circuit 17 determines that the load of the non-contact power reception device 3 is excessive if the acquired drain voltage Vds is equal to or larger than the determination criterion.

In the above embodiment, the processor 34 compares the drain voltage Vds with one threshold value previously set as the determination criterion at the determination timing, and determines that the load is excessive if the drain voltage Vds is equal to or larger than the threshold value, or contrarily determines that the load is appropriate if the drain voltage Vds is less than the threshold value; however, it is not limited thereto. The processor 34 may determine whether or not the load is appropriate depending on whether the drain voltage Vds at the determination timing is a value within a range (reference range) determined by an upper limit and a lower limit set in advance. In other words, the determination criterion may be a reference range having the upper limit and the lower limit.

For example, if the drain voltage Vds acquired at the determination timing is equal to or larger than the lower limit and less than the upper limit of the reference range, the processor 34 determines that the ZVS is normally performed. The processor 34 determines that the ZVS is not normally performed if the drain voltage Vds acquired at the determination timing is less than the lower limit or equal to or larger than the upper limit of the reference range. Specifically, the processor 34 determines that the actual load of the non-contact power reception device 3 is insufficient if the drain voltage Vds acquired at the determination timing is less than the lower limit of the reference range. The processor 34 determines that the actual load of the non-contact power reception device 3 is excessive if the drain voltage Vds acquired at the determination timing is equal to or larger than the upper limit of the reference range.

Specifically, the determination timing is immediately before the timing at which the conduction path between the drain terminal and the source terminal of the switching element is conducted. The reference range is 0 to x [V]. In other words, at the timing immediately before the timing at which the conduction path between the drain terminal and the source terminal of the switching element is conducted, the processor 34 determines that the ZVS is normally performed if the drain voltage Vds satisfies that $0 \leq Vds < x$.

According to the above configuration, the processor 34 can determine whether the actual load of the non-contact power reception device 3 is appropriate, insufficient, or excessive.

The processor 34 creates a message based on the result of the load amount determination process, and transmits the created message to the non-contact power reception device 3. For example, if the drain voltage Vds is equal to or larger than the lower limit and less than the upper limit of the reference range, the processor 34 transmits a message indicating that the load amount of the non-contact power reception device 3 and the coupling coefficient k are appropriate to the non-contact power reception device 3. If the drain voltage Vds is less than the lower limit of the reference range, the processor 34 transmits a message indicating that the actual load of the non-contact power reception device 3 is insufficient to the non-contact power reception device 3. If the drain voltage Vds is equal to or larger than the upper limit of the reference range, the processor 34 transmits a message indicating that the actual load of the non-contact power reception device 3 is excessive to the non-contact power reception device 3.

Furthermore, if the message indicating that the actual load of the non-contact power reception device 3 is insufficient is received, the control circuit 27 of the non-contact power reception device 3 may perform control to increase the load of the non-contact power reception device 3. For example, the control circuit 27 increases the load of the non-contact power reception device 3 by controlling the charging circuit 25 to increase a charging current applied to the secondary battery 23.

In the above embodiment, the processor 34 compares the drain voltage Vds acquired at the determination timing with one threshold value preset as the determination criterion; however, it is not limited thereto. The processor 34 may calculate an amount of change (e.g., inclination, etc.) of the drain voltage Vds at the determination timing, and determine whether or not the load is excessive depending on whether the inclination of the drain voltage Vds is equal to or larger than the preset threshold value.

Second Embodiment

Hereinafter, a load amount determination process according to a second embodiment is described.

The load amount determination process according to the second embodiment is different from that in the first embodiment in that the comparison between an integrated value of the drain voltage Vds between two timings and a threshold value is made instead of the comparison between the drain voltage Vds at a certain timing and the threshold value.

The timing generation circuit 32 according to the second embodiment generates a signal (e.g., a first timing signal, etc.) indicating a timing at which the state of the switching element is switched between the ON state and the OFF state and a signal (e.g., second timing signal, etc.) indicating a starting timing of integration of the values of the drain voltage Vds. The first timing signal is the same as the timing signal in the first embodiment. The second timing signal is a signal that rises at a timing that is a predetermined time earlier than the rising timing of the first timing signal.

Figure 8:
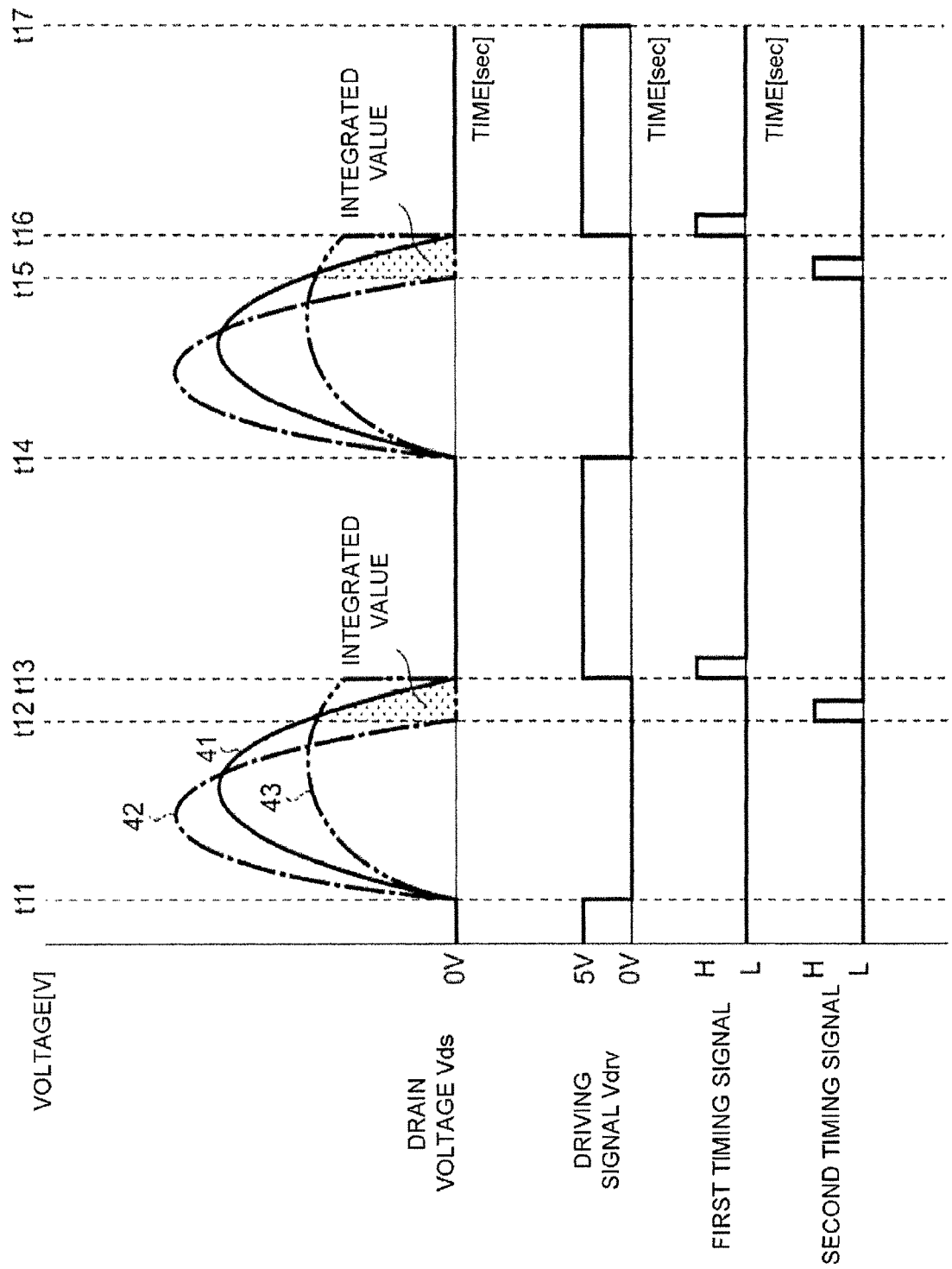
FIG. 8 is a diagram illustrating an example of an operation performed by a non-contact power transmission device according to a second embodiment.

FIG. 8 illustrates a graph showing an example of the drain voltage Vds, the driving signal Vdrv, the first timing signal, and the second timing signal in an application in which the switching element is in the OFF state from a timing t11 to a timing t13, the switching element is in the ON from the timing t13 to a timing t14, the switching element is in the OFF state from the timing t14 to a timing t16, and the switching element is in the ON state from the timing t16 to a timing t17.

The graph 41, the graph 42, and the graph 43 in FIG. 8 are similar to those of the first embodiment. In other words, the waveform of the drain voltage Vds are the same.

The first timing signal has a waveform that rises at the timing t13 and the timing t16.

The second timing signal has a waveform that rises at a timing t12 that is a predetermined time earlier than the timing t13, and at a timing t15 that is a predetermined time earlier than the timing t16.

The processor 34 integrates the values of the drain voltage Vds from a timing at which the second timing signal changes from L level to H level to a timing at which the first timing signal changes from L level to H level. The processor 34 compares the integrated value of the drain voltage Vds with the determination criterion. The processor 34 can determine whether the actual load of the non-contact power reception device 3 is appropriate, insufficient, or excessive based on the comparison result.

For example, the determination criterion is a reference range having an upper limit and a lower limit. If the integrated value of the drain voltage Vds is equal to or larger than the lower limit and less than the upper limit of the reference range, the processor 34 determines that the ZVS is normally performed. The processor 34 determines that the ZVS is not normally performed if the integrated value of the drain voltage Vds is less than the lower limit or equal to or larger than the upper limit of the reference range. Specifically, the processor 34 determines that the actual load of the non-contact power reception device 3 is insufficient if the integrated value of the drain voltage Vds is less than the lower limit of the reference range. The processor 34 determines that the actual load of the non-contact power reception device 3 is excessive if the integrated value of the drain voltage Vds is equal to or larger than the upper limit of the reference range.

According to the above configuration, the processor 34 can determine whether the actual load of the non-contact power reception device 3 is appropriate, insufficient, or excessive.

The processor 34 creates a message based on the result of the load amount determination process, and transmits the created message to the non-contact power reception device 3. For example, if the integrated value of the drain voltage Vds is equal to or larger than the lower limit and less than the upper limit of the reference range, the processor 34 transmits a message indicating that the load amount of the non-contact power reception device 3 and the coupling coefficient k are appropriate to the non-contact power reception device 3. If the integrated value of the drain voltage Vds is less than the lower limit of the reference range, the processor 34 transmits a message indicating that the actual load of the non-contact power reception device 3 is insufficient to the non-contact power reception device 3. If the integrated value of the drain voltage Vds is equal to or larger than the upper limit of the reference range, the processor 34 transmits a message indicating that the actual load of the non-contact power reception device 3 is excessive to the non-contact power reception device 3.

Next, the operation performed by the non-contact power transmission device 2 according to the Second Embodiment is described. The operation similar to that in FIG. 5 is the same as that in the First Embodiment, and thus the description thereof is omitted.

Figure 9:
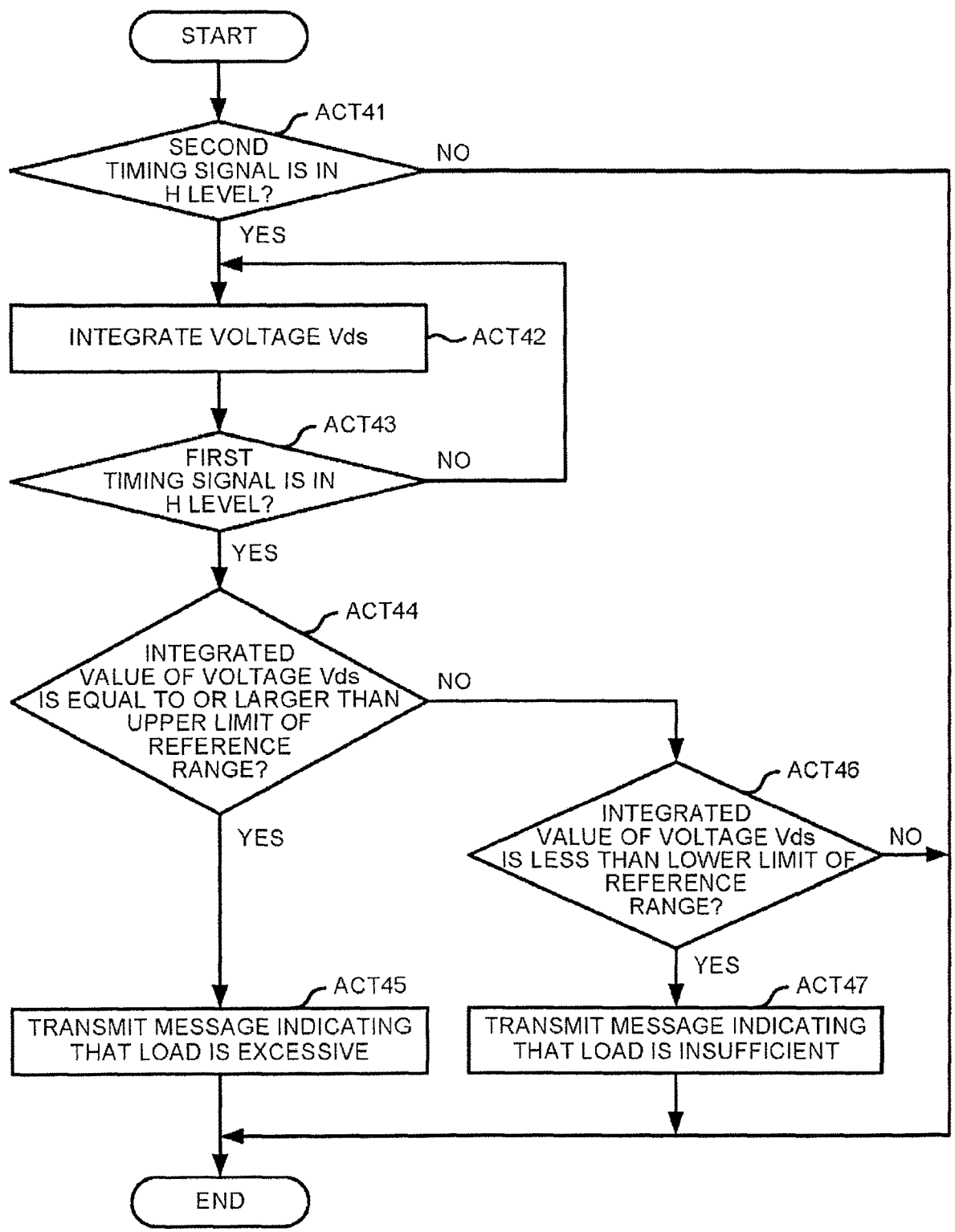
FIG. 9 is a diagram illustrating an example of an operation performed by the non-contact power transmission device according to the second embodiment.

FIG. 9 is a block diagram depicting an example of the load amount determination process in the non-contact power transmission device 2 according to the Second Embodiment.

First, the processor 34 determines whether or not the second timing signal changes from L level to H level (ACT 41). If it is determined that the second timing signal does not change from L level to H level (No in ACT 41), the processor 34 terminates the load amount determination process, and proceeds to the process in ACT 17 in FIG. 5.

If it is determined that the second timing signal changes from L level to H level (Yes in ACT 41), the processor 34 integrates the values of the drain voltage Vds (ACT 42).

The processor 34 determines whether or not the first timing signal changes from L level to H level (ACT 43). If it is determined that the first timing signal does not change from L level to H level (No in ACT 43), the processor 34 returns to the process in ACT 42 to continue to integrate the values of the drain voltage Vds.

If it is determined that the first timing signal changes from L level to H level (Yes in ACT 43), the processor 34 determines whether or not the integration result (integrated value) of the drain voltage Vds is equal to or larger than the upper limit of the reference range (ACT 44). If it is determined that the integrated value of the drain voltage Vds is equal to or larger than the upper limit of the reference range (Yes in ACT 44), the processor 34 transmits the message indicating that the actual load of the non-contact power reception device 3 is excessive to the non-contact power reception device 3 (ACT 45), terminates the load amount determination process and then proceeds to the process in ACT 17 in FIG. 5.

If it is determined that the integrated value of the drain voltage Vds is less than the upper limit of the reference range (No in ACT 44), the processor 34 determines whether or not the integration result (integrated value) of the drain voltage Vds is less than the lower limit of the reference range (ACT 46). If it is determined that the integrated value of the drain voltage Vds is less than the lower limit of the reference range (Yes in ACT 46), the processor 34 transmits the message indicating that the actual load of the non-contact power reception device 3 is insufficient to the non-contact power reception device 3 (ACT 47), terminates the load amount determination process and then proceeds to the process in ACT 17 in FIG. 5.

If it is determined that the integrated value of the drain voltage Vds is equal to or larger than the lower limit of the reference range (No in ACT 46), the processor 34 determines that the load amount of the non-contact power reception device 3 and the coupling coefficient k are appropriate, terminates the load amount determination process and then proceeds to the process in ACT 17 in FIG. 5. The processor 34 may transmit the message indicating that the actual load of the non-contact power reception device 3 is appropriate to the non-contact power reception device 3.

Next, the operation performed by the non-contact power reception device 3 according to the Second Embodiment is described.

Figure 10:
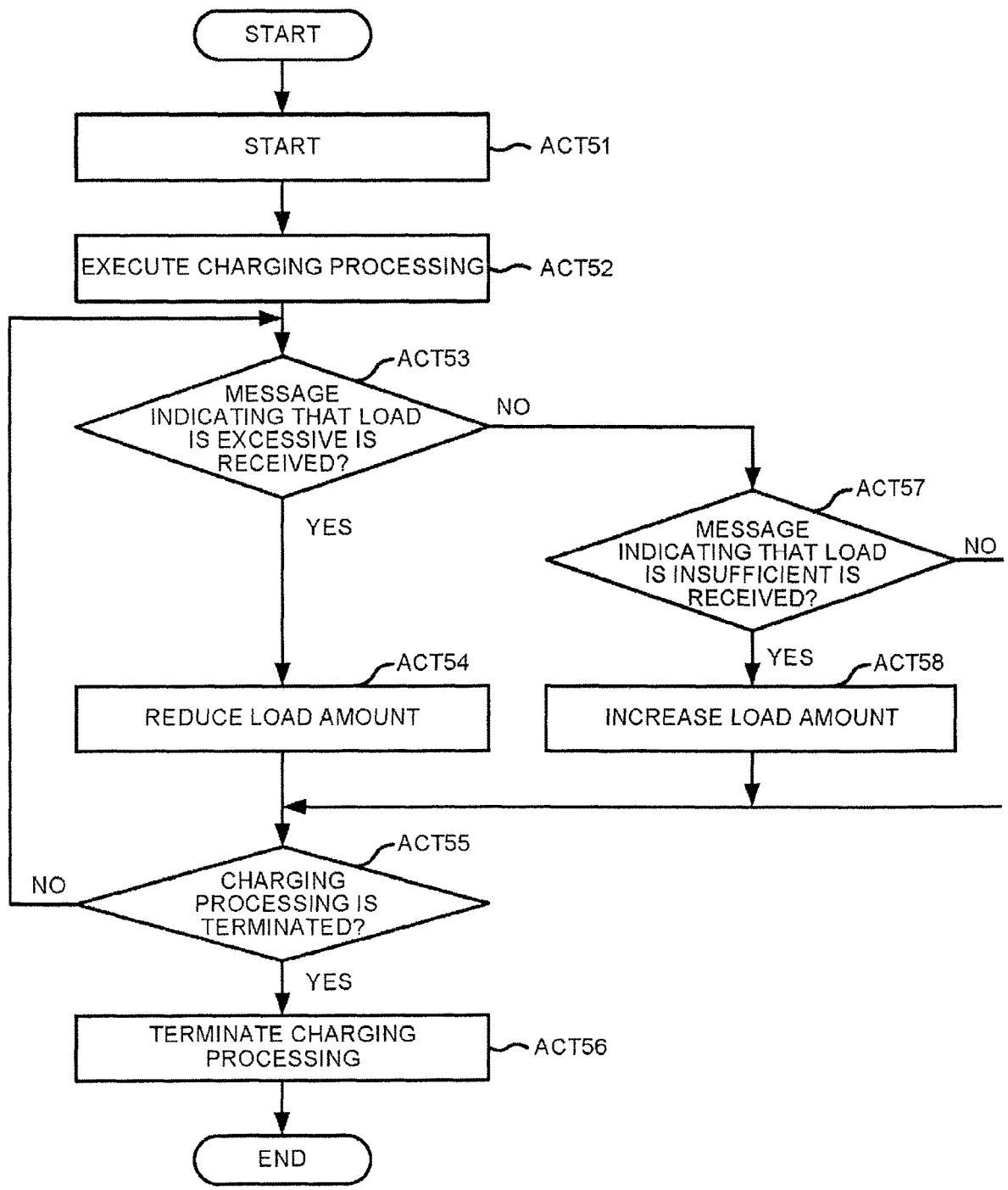
FIG. 10 is a diagram illustrating an example of an operation performed by a non-contact power reception device according to the second embodiment.

FIG. 10 is a block diagram depicting an example of the operation performed by the non-contact power reception device 3.

When placed on the power transmission stand 11 of the non-contact power transmission device 2, the non-contact power reception device 3 is started by the electric power supplied from the non-contact power transmission device 2 (ACT 51).

When started, the control circuit 27 of the non-contact power reception device 3 controls the charging circuit 25 to convert the DC power supplied from the power reception circuit 24 to the charging circuit 25 to charging power used for the charging process, and executes the charging process for supplying the charging power to the secondary battery 23 (ACT 52).

The control circuit 27 determines whether or not the message indicating that the load is excessive is received (ACT 53). If it is determined that the message indicating that the load is excessive is received (Yes in ACT 53), the control circuit 27 performs control to reduce the load amount of the non-contact power reception device 3 (ACT 54). In other words, the message indicating that the load is excessive plays a role of a command for instructing to reduce the load amount of the non-contact power reception device 3.

The control circuit 27 determines whether to terminate the charging process (ACT 55). For example, the control circuit 27 monitors a state of charging to the secondary battery 23 to determine whether or not the secondary battery 23 is fully charged. If it is determined that the secondary battery 23 is fully charged, the control circuit 27 determines to terminate the charging process.

If it is determined not to terminate the charging process (No in ACT 55), the control circuit 27 returns to the process in ACT 53 to again determine whether or not the message indicating that the load is excessive is received.

If it is determined to terminate the charging process (Yes in ACT 55), the control circuit 27 terminates the charging process (ACT 56), and thus terminates the process in FIG. 10.

If it is determined that the message indicating that the load is excessive is not received (No in ACT 53), the control circuit 27 determines whether or not the message indicating that the load is insufficient is received (ACT 57). If it is determined that the message indicating that the load is insufficient is received (Yes in ACT 57), the control circuit 27 performs control to increase the load amount of the non-contact power reception device 3 (ACT 58), and then proceeds to the process in ACT 55.

For example, the control circuit 27 increases the load amount generated due to the charging to the secondary battery 23 by increasing the current value of the charging power. For example, if the load changes due to the voltage applied to the secondary battery 23, the control circuit 27 may increase the load amount generated due to the charging to the secondary battery 23 by increasing the voltage value of the charging power.

For example, the control circuit 27 may control the display section 22 to display a message for instructing the user to fix the position of the non-contact power reception device 3 on the power transmission stand 11. The message displayed on the display section 22 is used to instruct the user to reposition the non-contact power reception device 3 on the power transmission stand 11 so as to increase the coupling coefficient k. Specifically, the message displayed on the display section 22 is used to instruct the user to bring the center Cy of the power reception coil 21 closer to the center Cx of the power transmission coil 13 of the power transmission stand 11. In this application, the user who confirms the message displayed on the display section 22 repositions the non-contact power reception device 3 on the power transmission stand 11, thereby increasing the coupling coefficient k. As a result, the non-contact power reception device 3 is placed at an appropriate position with respect to the non-contact power transmission device 2, and the power transmission coil 13 and the power reception coil 21 can be coupled to each other at the previously assumed coupling coefficient. As a result, the ZVS is normally performed.

If the message indicating that the load is insufficient is not received (No in ACT 57), or if the message indicating that the load is appropriate is received, the control circuit 27 proceeds to the process in ACT 55.

As described in more detail herein, the control circuit 17 of the non-contact power transmission device 2 calculates the integrated value of the drain voltage Vds from the timing that is a predetermined time earlier than the timing at which the switching element is turned on to the timing at which the switching element is turned on. Specifically, the control circuit 17 calculates the integrated value of the drain voltage Vds between two timings. The control circuit 17 determines that the load of the non-contact power reception device 3 is excessive if the integrated value of the drain voltage Vds is equal to or larger than the upper limit of the reference range which is the determination criterion. Furthermore, if it is determined that the load of the non-contact power reception device 3 is excessive, the control circuit 17 controls the wireless communication circuit 16 to notify the non-contact power reception device 3 of the message indicating that the load is excessive. The control circuit 27 of the non-contact power reception device 3 receiving the message indicating that the load is excessive performs control to reduce the load of the non-contact power reception device 3.

Thus, the non-contact power transmission device 2 can request the non-contact power reception device 3 having a load exceeding the rating of the non-contact power transmission device 2 to perform control so as to reduce the load amount thereof to the appropriate value. As a result, the non-contact power transmission device 2 can prevent the through current from flowing to the switching element of the power transmission circuit 15.

The control circuit 17 determines that the load of the non-contact power reception device 3 is insufficient if the integrated value of the drain voltage Vds is less than the lower limit of the reference range that is the determination criterion. If it is determined that the load of the non-contact power reception device 3 is insufficient, the control circuit 17 controls the wireless communication circuit 16 to notify the non-contact power reception device 3 of the message indicating that the load is insufficient. The control circuit 27 of the non-contact power reception device 3 receiving the message indicating that the load is insufficient performs control to increase the load of the non-contact power reception device 3. In this way, the non-contact power transmission device 2 can efficiently supply the electric power to the non-contact power reception device 3.

In the above embodiment, the control circuit 27 of the non-contact power reception device 3 starts the charging process for the secondary battery when started, but the charging current may be gradually increased after the charging process is started. After the charging process is started, the control circuit 27 may perform control to keep the charging current small first, then gradually increase the charging current with time and finally maximize the charging current at a timing after a sufficient time period elapses. According to such a configuration, as soon as the charging process is started, the load of the non-contact power reception device 3 becomes excessive, thereby preventing the through current from flowing to the switching element of the power transmission circuit 15. The control circuit 27 performs control to increase the load according to the message supplied from the non-contact power transmission device 2 when the load of the non-contact power reception device 3 is insufficient. The control circuit 27 performs control to reduce the load according to the message supplied from the non-contact power transmission device 2 when the load of the non-contact power reception device 3 becomes excessive. Thereby, the control circuit 27 can perform control to change the load of the non-contact power reception device 3 to an appropriate value for the non-contact power transmission device 2.

In the above embodiment, the control circuit 17 of the non-contact power transmission device 2 performs the load amount determination process each time the switching element is turned on; however, it is not limited thereto. The control circuit 17 may perform the load amount determination process each time the switching element is turned off a plurality of times. The control circuit 17 may perform the load amount determination process at predetermined time intervals.

The control circuit 17 may not transmit the message to the non-contact power reception device 3 based on the result of the load amount determination process each time the load amount determination process is performed, and may transmit the message to the non-contact power reception device 3 based on the results of the load amount determination process performed a plurality of times. For example, the control circuit 17 may transmit the message according to the result to the non-contact power reception device 3 when the results of the load amount determination process are the same continuously for a predetermined number of times set in advance. For example, the control circuit 17 may transmit the message to the non-contact power reception device 3 based on a ratio of the results of the load amount determination process performed a plurality of times.

As soon as the power transmission is started, there is a possibility that the operation of the power transmission circuit 15 is not stabilized, the load of the non-contact power reception device 3 is not stabilized, or the coupling coefficient k between the power transmission coil 13 and the power reception coil 21 is not stabilized. For this reason, the control circuit 17 may not execute the load amount determination process within a predetermined time period after the power transmission is started.

The functions described in the above-described embodiments are configured by using hardware and also can be performed by enabling a computer to read programs for describing the functions by using software. The functions may be selectively configured by either software or the hardware as appropriate.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A power transmission device for use with a power reception device having a power reception coil, the power transmission device comprising:
    a power transmission coil that is configured to be magnetically coupled to a power reception coil of a power reception device;
    a power transmission circuit comprising a switching element and configured to switch the switching element to apply alternating current to the power transmission coil;
    a communication circuit configured to establish communication with the power reception device; and
    a control circuit configured to control switching of the power transmission circuit, determine whether or not a load of the power reception device is greater than a threshold based on an output voltage from the switching element and a determination criterion, and provide a notification to the power reception device from the communication circuit, the notification indicating that the load is greater than the threshold, the communication circuit configured to provide the notification in response to determining that the load is greater than the threshold.

2. The power transmission device of claim 1, wherein the control circuit is configured to determine:
    if the output voltage of the switching element is equal to or greater than the determination criterion at a timing at which the switching element is turned on based on the output voltage of the switching element; and
    that the load is greater than the threshold if it is determined that the output voltage of the switching element is equal to or greater than the determination criterion.

3. The power transmission device of claim 2, wherein the control circuit is configured to determine that the load of the power reception device is greater than the threshold if it is determined that the output voltage of the switching element is equal to or greater than the determination criterion at a timing that is a predetermined time earlier than the timing at which the switching element is turned on.

4. The power transmission device of claim 2, wherein the control circuit is configured to determine that the load of the power reception device is greater than the threshold if it is determined that an integrated value of the output voltage of the switching element from a timing that is a predetermined time earlier than the timing at which the switching element is turned on to the timing at which the switching element is turned on is equal to or larger than the determination criterion.

5. The power transmission device of claim 1, wherein the control circuit is configured to compare a timing counter to a first timing, compare the output voltage to a determination criterion in response to the timing counter being equal to the first timing, and determine that the load is greater than the threshold in response to the output voltage being equal to or greater than the determination criterion.

6. The power transmission device of claim 5, wherein the first timing is associated with a time at which the switching element is turned on.

7. The power transmission device of claim 6, wherein:
    the control circuit is configured to compare the timing counter to a second timing, compare the output voltage to the determination criterion in response to the timing counter being equal to the second timing, and determine that the load is greater than the threshold in response to the output voltage is equal to or greater than the determination criterion; and
    the second timing is different from the first timing.

8. The power transmission device of claim 7, wherein the second timing is less than the first timing.

9. The power transmission device of claim 8, wherein the control circuit is configured to determine an integrated value of the output voltage from the first timing to the second timing, compare the integrated value to the determination criterion, and determine that the load of the power reception device is greater than the threshold in response to the integrated value is equal to or greater than the determination criterion.

10. A power reception device for use with a power transmission device having a power transmission coil, the power reception device comprising:
    a power reception coil that is configured to be magnetically coupled to a power transmission coil of a power transmission device and to receive electric power;
    a battery;
    a charging circuit configured to apply charging current to the battery to charge the battery using the electric power received by the power reception coil;
    a communication circuit configured to establish communication with the power transmission device; and
    a control circuit configured to control the charging circuit to reduce the charging current if a message indicating that a load is greater than a threshold is received from the power transmission device.

11. A power transmission system comprising:
    a power reception device comprising:
        a power reception coil configured to receive electric power;
        a battery;
        a charging circuit configured to apply charging current to the battery to charge the battery using the electric power received by the power reception coil;
    a power transmission device comprising:
        a power transmission coil that is magnetically coupled to the power reception coil;
        a power transmission circuit comprising a switching element and configured to switch the switching element to apply alternating current to the power transmission coil;
        a first communication circuit configured to establish communication with the power reception device; and
        a first control circuit configured to control switching of the power transmission circuit, determine if a load of the power reception device is greater than a threshold based on an output voltage from the switching element and a determination criterion, and notify the power reception device that the load is greater than the threshold via the first communication circuit if it is determined that the load of the power reception device is greater than the threshold, and the power reception device further comprises:
   a second communication circuit configured to establish communication with the power transmission device; and
   a second control circuit configured to control the charging circuit to reduce the charging current if a message indicating that a load is greater than the threshold is received from the power transmission device via the second communication circuit.

* * * * *